Feb. 18, 1958     L. J. GANGELL     2,823,799
AUTOMOBILE TRASH DISPOSAL
Filed July 8, 1955     2 Sheets-Sheet 1
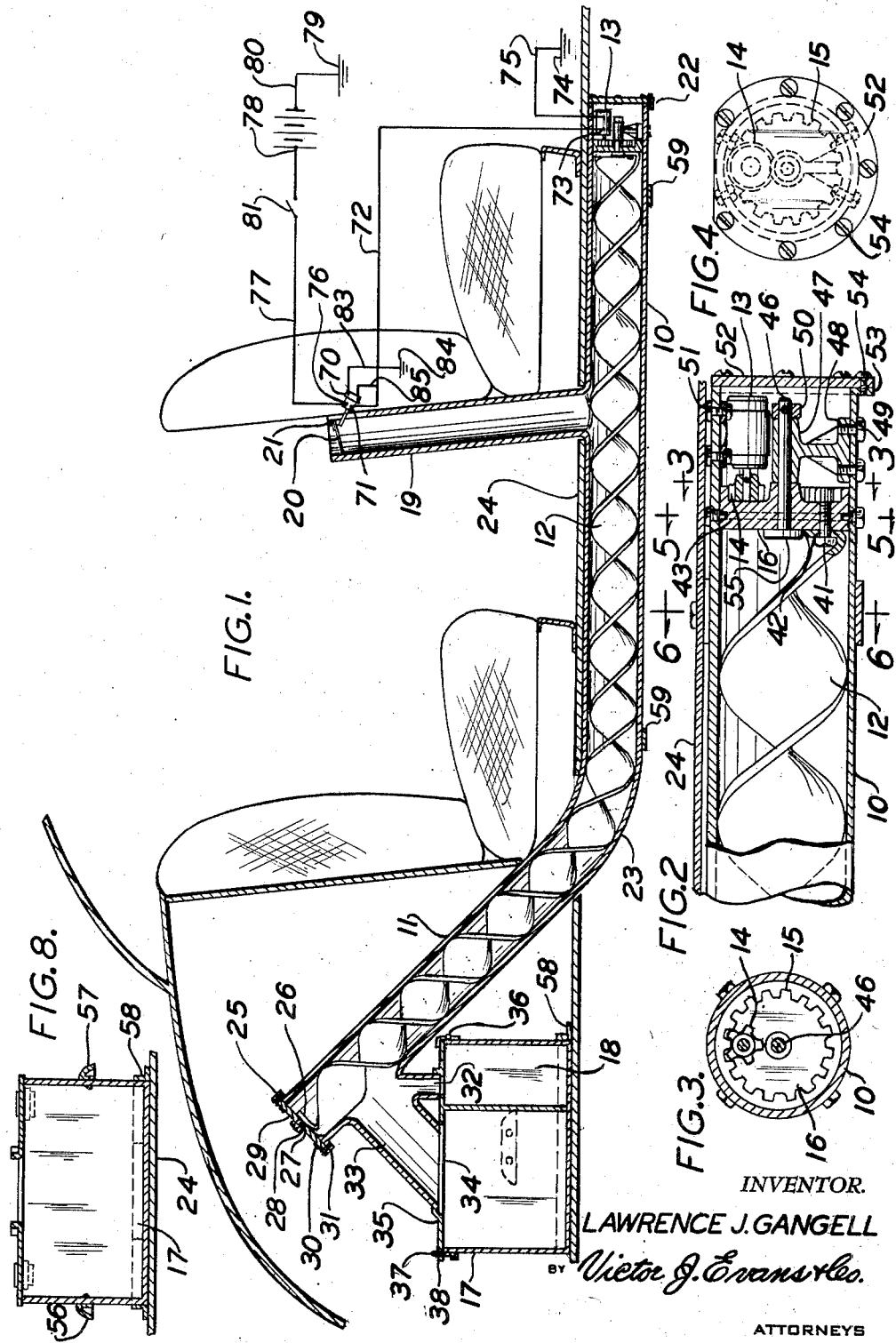
INVENTOR.
LAWRENCE J. GANGELL
BY Victor J. Evans & Co.
ATTORNEYS

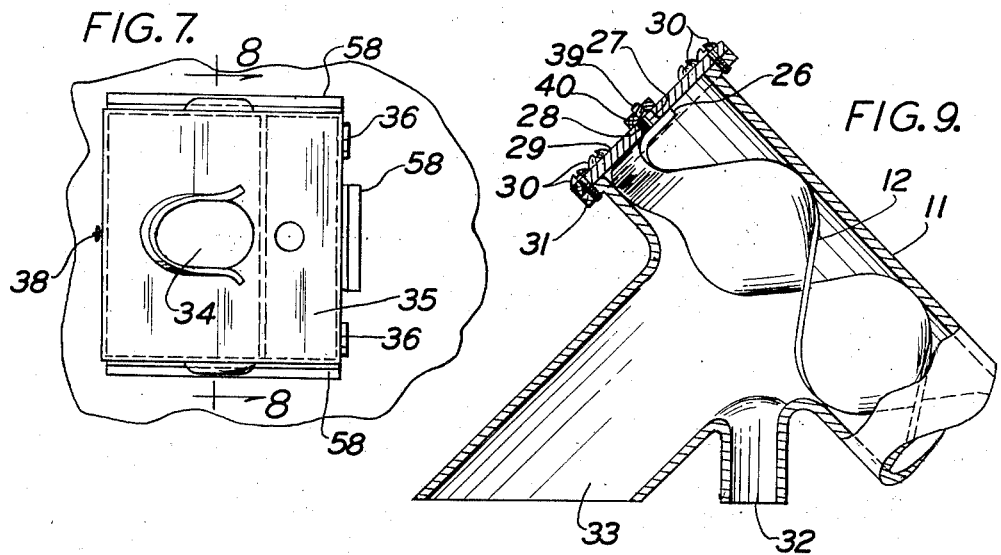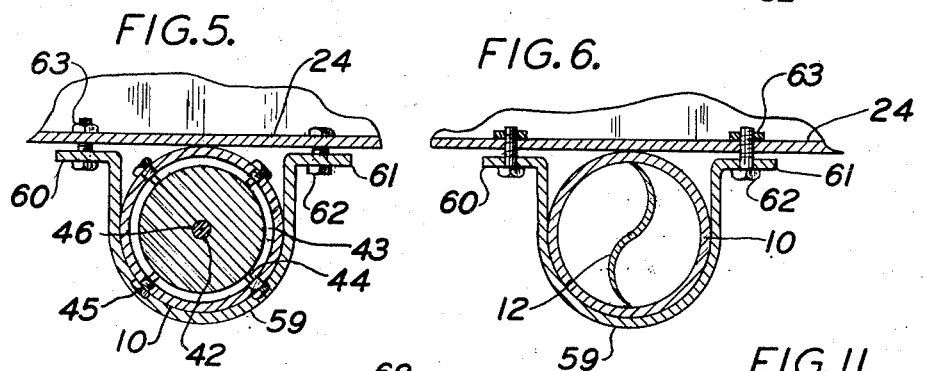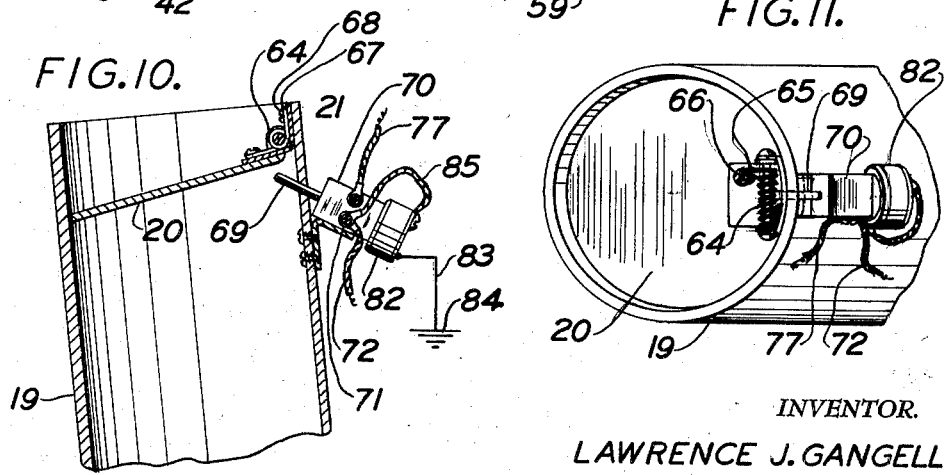

2,823,799
     AUTOMOBILE TRASH DISPOSAL

Lawrence J. Gangell, Bloomfield, N. J.

Application July 8, 1955, Serial No. 520,832

3 Claims. (Cl. 209—83)

This invention relates to trash and garbage disposals particularly of the type adapted to be used in motor vehicles, and in particular, a tube adapted to be positioned below the floor of a vehicle, such as a passenger car, with an intake tube positioned at the rear of the back of a front seat and with discharge connections positioned to coact with containers in the trunk of the vehicle, and in which a spiral band in the form of a screw conveyor extends through the tube and is adapted to be rotated by a motor to carry products from the intake tube to the containers positioned to receive products from the discharge connections.

The purpose of this invention is to provide means in a motor vehicle for receiving trash and the like in order to prevent trash being thrown from windows of vehicles.

Numerous roads and highways throughout the country are made unsightly by beer cans, garbage, and other trash thrown from windows of passing vehicles and it has been found substantially impossible to control the practice of throwing trash and the like from windows of vehicles. With this thought in mind, this invention contemplates a receptacle positioned in the vehicle and extended from a disposal system whereby cans, garbage, and other trash deposited into the device are carried to a container in a trunk of a vehicle whereby at the end of a trip, or at suitable points on a highway, trash and the like may be removed from the device and deposited into a conventional trash can.

The object of this invention is, therefore, to provide a disposal system adapted to be used in motor vehicles, particularly of the passenger type, wherein cans, from which products have been removed, garbage, papers, and other trash deposited into the device is readily carried to the trunk or other part of the vehicles.

Another object of the invention is to provide a trash disposal system for motor vehicles wherein discarded trash and the like is conveyed to a container in a trunk of a vehicle whereby the trash is accumulated and may be removed or discarded at predetermined stations.

Another important object of the invention is to provide a trash disposal system for motor vehicles that is adapted to be installed in vehicles now in use.

A further object of the invention is to provide a trash disposal system for motor vehicles in which the system is of a simple and economical construction.

With these and other objects and advantages in view, the invention embodies a tube extended from a point at the forward part of a vehicle through the intermediate part of the vehicle and to the interior of the trunk thereof, a screw conveyor positioned in the tube, means for rotating the screw conveyor, an intake spout or tube extended upwardly from the tube in which the conveyor is positioned, a container positioned in the trunk of the vehicle for receiving trash from the tube and means whereby the screw conveyor is rotated upon opening a door of the tube and whereby the conveying means is stopped as products are removed from the tube.

Other features and advantages of the invention will appear from the following description, taken in connection with the drawings, wherein:

Figure 1 is a typical longitudinal section through the intermediate portion of a motor vehicle of the passenger type showing the disposal conveying tube or housing with screw conveying means therein positioned below the floor of the vehicle and extended from a point in the forward part thereof to a point above the floor and in the trunk and also showing an intake tube extended upwardly from the intermediate part of the conveyor, parts of the vehicle being omitted.

Figure 2 is a longitudinal section with the parts shown on an enlarged scale through the leading end of the screw conveyor tube showing the motor and conveyor operating elements.

Figure 3 is a cross section through the operating end of the tube, taken on line 3—3 of Figure 2, also with the parts shown on an enlarged scale.

Figure 4 is an end elevational view of the tube particularly as shown in Figure 2.

Figure 5 is a cross section through a conveyor rotating disc, taken on line 5—5 of Figure 2, and illustrating a hanger by which the tubular housing is supported from the floor of the vehicle.

Figure 6 is a similar section also showing a hanger and illustrating the position of the spiral in the tube or housing, said section being taken on line 6—6 of Figure 2.

Figure 7 is a plan view of a container adapted to be positioned in the trunk of a vehicle and connected to the discharge opening of the conveyor housing.

Figure 8 is a cross section through the trash receiver or container, being taken on line 8—8 of Figure 7.

Figure 9 is a longitudinal section through the discharge end of the trash conveying tube, the parts being shown on an enlarged scale.

Figure 10 is a vertical section through the upper end of the intake tube with the parts as shown in Figure 1 and with the parts shown on an enlarged scale.

Figure 11 is a plan view of the upper end of the intake tube, said parts also being shown on an enlarged scale.

Referring now to the drawings, wherein like reference characters denote corresponding parts, the improved motor vehicle trash disposal of this invention includes a horizontally disposed tube 10 having an upwardly inclined trailing end 11 with a strip of material or band 12 formed in a spiral extended through the tube, a motor 13 positioned to rotate the spiral through gears 14 and 15 and a disc 16, a trash receiving container 17 having a relatively small section 18 for receiving cigarette butts and the like and an intake tube 19 extended upwardly from the intermediate part of the tube 10 and having a gate or door 20 mounted by a hinge 21 in the upper end.

Although the tube 10 is of such a size that cans, like beer cans and the like, are adapted to travel freely therethrough, it will be understood that the tube may be of any suitable size and, as illustrated in Figure 1, the tube is adapted to extend from a point 22 at the leading end to an arcuate section or elbow 23, below a floor 24 of a vehicle and from the elbow 23 upwardly to a point 25 which is positioned above the receptacles or containers 17 and 18.

The conveying means is provided with the band 12 formed in a spiral with one end 26 rotatably mounted by a pin 27 in an opening 28 in a disc 29 and, as illustrated in Figure 9, the disc is secured by bolts 30 to an annular flange 31 on the upper end of the section 11 of the trash disposable tube.

The discharge or trailing end of the tube is also provided with separating means whereby small particles, such as cigarette butts and the like, drop downwardly through a tube 32 and larger articles, such as cans and the like, drop through a spout 33. The spout 33 opens into the upper end of the large container 17 and the spout 32 is positioned to drop cigarette butts and the like into the section 18 of the trash receiving container. The spout 33 communicates with an opening 34 in a cover 35 secured by a hinge 36 to the upper end of the trash receiving container and the opposite side of the cover is retained in the closed position by a latch in the form of a toothed prong 37 that extends through a hasp 38.

The pin 27 on which the end 26 of the screw conveying band or element 12 is mounted is provided with a threaded stud 39 that is retained in position with a nut 40 and the opposite end of the band forming the conveyor is secured by a bolt 41 to the rotatable disc 16, the bolt 41 extending through an eye 42 on the end of the band, as illustrated in Figure 2.

The disc 16 is provided with an annular groove 43 in which points 44 of stud bolts 45 are positioned, as shown in Figure 5, and one side of the disc is provided with an internal gear ring forming the gear 15 that meshes with the pinion 14 on the shaft of the motor 13.

The disc 16 is mounted on a shaft 46 which is rotatably mounted in a bearing 47, a flange 48 of which is secured to the tube 10 with bolts 49 and the shaft is retained in position in the bearing with a set collar 50. The motor is also secured in position in the end of the tube with bolts or cap screws, as indicated by the numeral 51, and the end of the tube 10 is closed with a plate 52 that is secured to a flange 53 with cap screws 54. The shaft 46 is provided with an enlarged head 55 to retain the disc 16 in position thereon and upon completing a circuit to the motor 13 the pinion 14 of the motor shaft rotates the disc 16 through the internal gear 15 whereby the spiral 12 is rotated to carry trash from the intake spout or connection 19 through the spouts 32 and 33 and to the trash receiving containers 17 and 18.

The sides of the trash receiver housing are provided with handles 56 and 57 to facilitate removing the container and, as shown in Figures 1 and 8, the container is adapted to be positioned in locating angle bars 58 which are permanently positioned upon the floor 24.

As illustrated in Figures 5 and 6, the conveyor tube 10 is suspended from the floor 24 with strap hangers 59 having flanges 60 and 61 extended from the ends and bolts 62 with nuts 63 thereon provide means for removably connecting the hangers to the floor.

The gate or door 20 of the intake spout or tube 19 is urged upwardly to the closed position by a coil spring 64, one end 65 of which is secured to the cover 20 with a screw 66 and the opposite end 67 is secured to the wall of the tube with a screw 68. The door is adapted to move downwardly in order to open the upper end of the tube when depositing trash therein and, as illustrated in Figure 10, downward movement of the door causes the upper end of the door to engage a pin 69 extended from a switch 70 and upon inward movement of the pin a circuit is completed to the motor 13 to rotate the conveyor 12 to carry products from the chute 19 to the discharge spouts or tubes 33 and 32. The switch 70 is provided with a delayed action whereby the motor continues to operate until trash deposited through the spout 19 reaches the receiver container 17.

As illustrated in Figure 1, a terminal 71 of the switch is connected by a wire 72 to a terminal 73 of the motor and the opposite terminal of the motor is connected to a ground 74 by a wire 75. An opposite terminal 76 of the switch is connected by a wire 77 to one side of a battery 78 and the opposite side of the battery is connected to a ground 79 with a wire 80. The wire 77 is provided with a switch 81 whereby the circuit to the disposal may be broken when desired. A delayed action section 82 of the switch 70 is connected by a wire 83 to a ground 84 and by a wire 85 to the wire 72 which extends to one terminal of the motor. By this means the motor continues to operate after products are deposited in the conveyor until the products reach the receiving containers 17 and 18.

It will be understood that modifications, within the scope of the appended claims, may be made in the design and arrangement of the parts without departing from the spirit of the invention.

What is claimed is:

1. A trash disposal for motor vehicles comprising in combination with a floor for the vehicle, a horizontally disposed conveyor tube having an intake section and said tube is adapted to be mounted below the floor of the vehicle with an intake tube communicating with the intake section of said conveyor tube and adapted to extend upwardly through the floor of the vehicle and with the trailing end of the conveyor tube also adapted to extend upwardly through the floor of the vehicle, a flexible conveyor element including a spiral band extended through said conveyor tube in operative association with said intake tube, a motor operatively connected to said spiral band for rotating the band to provide a screw conveyor, a door at the upper end of said intake tube, a depending spout communicating with and extended from the upwardly extended trailing end of the conveyor tube with the inner end of said spout being in operative association with said spiral band, a trash receiving container positioned to receive trash from the depending spout of the conveyor tube, means completing a circuit to the motor of the spiral conveyor element upon opening of the door of the intake tube, and a delayed action element for breaking the circuit to the motor after a predetermined period of time.

2. A trash disposal for motor vehicles comprising in combination with a floor for the vehicle, a horizontally disposed conveyor tube having an intake section and said tube is adapted to be mounted below the floor of the vehicle with an intake tube communicating with the intake section of said conveyor tube and adapted to extend upwardly through the floor of the vehicle and with the trailing end of the conveyor tube also adapted to extend upwardly through the floor of the vehicle, a flexible conveyor element including a spiral band extended through said conveyor tube in operative association with said intake tube, a motor operatively connected to said spiral band for rotating the band to provide a screw conveyor, a door at the upper end of said intake tube, a trash receiving container adapted to be positioned in a trunk of the vehicle, depending spouts communicating with and extended downwardly from the upwardly extended section of the conveyor tube with the inner ends of said spouts being in operative association with said spiral band and with the outer ends of said spouts and communicating with sections of the trash receiving container, one of said depending spouts being comparatively small and located ahead of the other of said depending spouts for selectively carrying cigarette butts and the like to a section of the trash receiving container and the other depending spout being adapted to selectively carry objects such as beer cans from the conveyor to another section of said trash receiving container, means for completing a circuit to the motor of the spiral conveyor element upon opening of the door of the intake tube, and a delayed action element for breaking the circuit to the motor after a predetermined period of time.

3. In a trash disposal for motor vehicles of the passenger car type, the combination which comprises a vehicle body having a floor with openings therethrough and with seats thereon, an elongated longitudinally positioned conveyor tube suspended below the floor with an intake tube communicating with said conveyor tube and extended upwardly through one of said openings in the floor and positioned to the rear of a front seat of the vehicle, a door pivotally mounted in the upper end of the intake tube, said conveyor tube having an upwardly inclined trailing end extended through another of the openings in the floor of the vehicle, a coil extended through said tube in operative association with said intake tube, means pivotally mounting one end of the coil on an end of the tube, a motor, gear, and disc assembly in the opposite end of the tube and operatively connected to said coil for rotating the coil to provide a screw conveyor, means for completing a circuit to the motor of the conveyor for operating the coil as the door of the intake tube is opened, a delayed action device for maintaining a circuit to the motor a predetermined period after the circuit is completed by opening the door of the intake tube, and a trash receiver container having a large compartment and a small compartment, the upwardly inclined section of said conveyor tube having a large spout and a small spout depending therefrom and positioned with the small spout extended into a small section of the trash receiving container and with a large spout extended into a large section of said trash receiving container, said small spout being located ahead of said large spout to provide selective separation of solids from solids deposited in said intake tube.

References Cited in the file of this patent

UNITED STATES PATENTS

| | | |
|---|---|---|
| 2,130,099 | Peterson | Sept. 13, 1938 |
| 2,302,532 | Downing | Nov. 17, 1942 |
| 2,307,692 | Linde | Jan. 5, 1943 |
| 2,327,313 | Martin | Aug. 17, 1943 |
| 2,556,370 | Holmes | June 12, 1951 |
| 2,558,255 | Johnson et al. | June 26, 1951 |
| 2,680,569 | Nicholas | June 8, 1954 |

FOREIGN PATENTS

| | | |
|---|---|---|
| 961,561 | France | Nov. 21, 1949 |